United States Patent
Syed

(10) Patent No.: US 12,438,784 B1
(45) Date of Patent: Oct. 7, 2025

(54) METHODS AND SYSTEMS FOR DISCRETE EVENT NETWORK SIMULATION

(71) Applicant: Google LLC, Mountain View, CA (US)

(72) Inventor: Zamir Uddin Syed, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/627,924

(22) Filed: Apr. 5, 2024

(51) Int. Cl.
*G06F 15/173* (2006.01)
*H04L 41/069* (2022.01)
*H04L 41/12* (2022.01)
*H04L 41/14* (2022.01)

(52) U.S. Cl.
CPC .......... *H04L 41/145* (2013.01); *H04L 41/069* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 6,859,929 B1* | 2/2005 | Smorodinsky | G06F 9/5061 719/310 |
| 10,523,503 B2* | 12/2019 | Williams | H04L 41/145 |
| 2009/0254894 A1* | 10/2009 | Chen | G06F 11/008 717/155 |
| 2013/0073908 A1* | 3/2013 | Miyazaki | G06F 11/0781 714/E11.029 |
| 2017/0012848 A1 | 1/2017 | Zhao et al. | |
| 2018/0211204 A1* | 7/2018 | Bruns | G06Q 10/087 |
| 2019/0268234 A1 | 8/2019 | Cheng et al. | |
| 2022/0078087 A1* | 3/2022 | Grant | H04L 45/03 |
| 2022/0217055 A1 | 7/2022 | Dewar et al. | |

* cited by examiner

*Primary Examiner* — Phuoc H Nguyen
(74) *Attorney, Agent, or Firm* — Lerner David LLP

(57) ABSTRACT

Aspects of the disclosure provide for discrete event network simulation (DENS) including failure modeling, network simulation, and metric reporting. A failure modeler can generate and model expected failure events. A network simulator can implement and execute the simulation processes with the failure events and calculate the flow availability of the network during the simulation processes. A report generator can generate various metrics from the simulation results.

18 Claims, 6 Drawing Sheets

METHODS AND SYSTEMS FOR DISCRETE EVENT NETWORK SIMULATION

BACKGROUND

Software toolkits are available for simulating network traffic routing at a packet-level. The purpose of the software toolkits is to assist in evaluating network routing software within short timeframes, such as days, hours, or minutes, using simulators. However, these simulators do not account for the potential complexity of network failures over extended periods and how such complexity may affect the network's ability to meet one or more service level objectives (SLOs). Network failures can be caused by common problems such as device failure or fiber damage, such as fiber cuts. Network failures can also be caused by large-scale disasters, such as natural disasters, which can destroy fiber or disrupt power supplies, taking down part or all of the network and requiring significant time and resources to recover.

BRIEF SUMMARY

Aspects of the disclosure are directed to discrete event network simulation (DENS) including failure modeling, network simulation, and metric reporting. A failure modeler can generate and model expected failure events. A network simulator can implement and execute the simulation processes with the failure events and calculate the flow availability of the network during the simulation processes. A report generator can generate various metrics from the simulation results. DENS can assist in the estimation of the risk that a network will not be able to support the customer demands over a specified set of time window.

An aspect of the disclosure provides for a method for discrete event network simulation, the method including: modeling, by one or more processors, a plurality of discrete events comprising failure events and repair events; building, by one or more processors, one or more simulation processes based on the modeled discrete events; executing, by one or more processors, the one or more simulation processes for a network simulation by generating the failure events and the repair events; and generating, by one or more processors, metrics for traffic flow of the network simulation based on the executed simulation processes.

In an example, the one or more simulation processes are built based on component-level risks. In another example, the one or more simulation processes are built using a K-means clustering technique.

In yet another example, the failure events are modeled as an exponential distribution with an empirically sourced mean time between failures (MTBFs) and the repair events are modeled as a fixed repair time equal to an empirically sourced mean time between failures (MTTRs).

In yet another example, the executing one or more simulation processes includes receiving, by one or more processors, network topology data, traffic flow data, and traffic engineering techniques.

In yet another example, the method further includes generating, by the one or more processors, the plurality of discrete events for the network simulation.

In yet another example, the method further includes enqueueing, by the one or more processors, the generated plurality of discrete events into event queues. In yet another example, the network topology data is updated when the one or more simulation processes are executed using the plurality of discrete events.

Another aspect of the disclosure provides for a system including: one or more processors; and one or more storage devices coupled to the one or more processors and storing instructions that, when executed by the one or more processors, cause the one or more processors to perform operations for discrete event network simulation (DENS), the operations comprising: modeling a plurality of discrete events comprising failure events and repair events; building one or more simulation processes based on the modeled discrete events; executing the one or more simulation processes for a network simulation by generating the failure events and the repair events; and generating metrics for traffic flow of the network simulation based on the executed simulation processes.

In an example, the one or more simulation processes are built based on component-level risks. In another example, the one or more simulation processes are built using a K-means clustering technique.

In yet another example, the failure events are modeled as an exponential distribution with an empirically sourced mean time between failures (MTBFs) and the repair events are modeled as a fixed repair time equal to an empirically sourced mean time between failures (MTTRs).

In yet another example, the executing one or more simulation processes includes receiving network topology data, traffic flow data, and traffic engineering techniques.

In yet another example, the operations further include generating the plurality of discrete events for the network simulation. In yet another example, the operations further include enqueueing the generated plurality of discrete events into event queues.

In yet another example, the network topology data is updated when the one or more simulation processes are executed using the plurality of discrete events.

Another aspect of the disclosure provides for a non-transitory computer readable medium for storing instructions that, when executed by one or more processors, cause the one or more processors to perform operations for discrete event network simulation (DENS), the operations comprising: modeling a plurality of discrete events comprising failure events and repair events; building one or more simulation processes based on the modeled discrete events; executing the one or more simulation processes for a network simulation by generating the failure events and the repair events; and generating metrics for traffic flow of the network simulation based on the executed simulation processes.

In an example, the operations further include generating the plurality of discrete events for the network simulation.

In another example, the executing one or more simulation processes includes receiving network topology data, traffic flow data, and traffic engineering techniques.

In yet another example, the network topology data is updated when the one or more simulation processes are executed using the plurality of discrete events.

DETAILED DESCRIPTION

Figure 1:
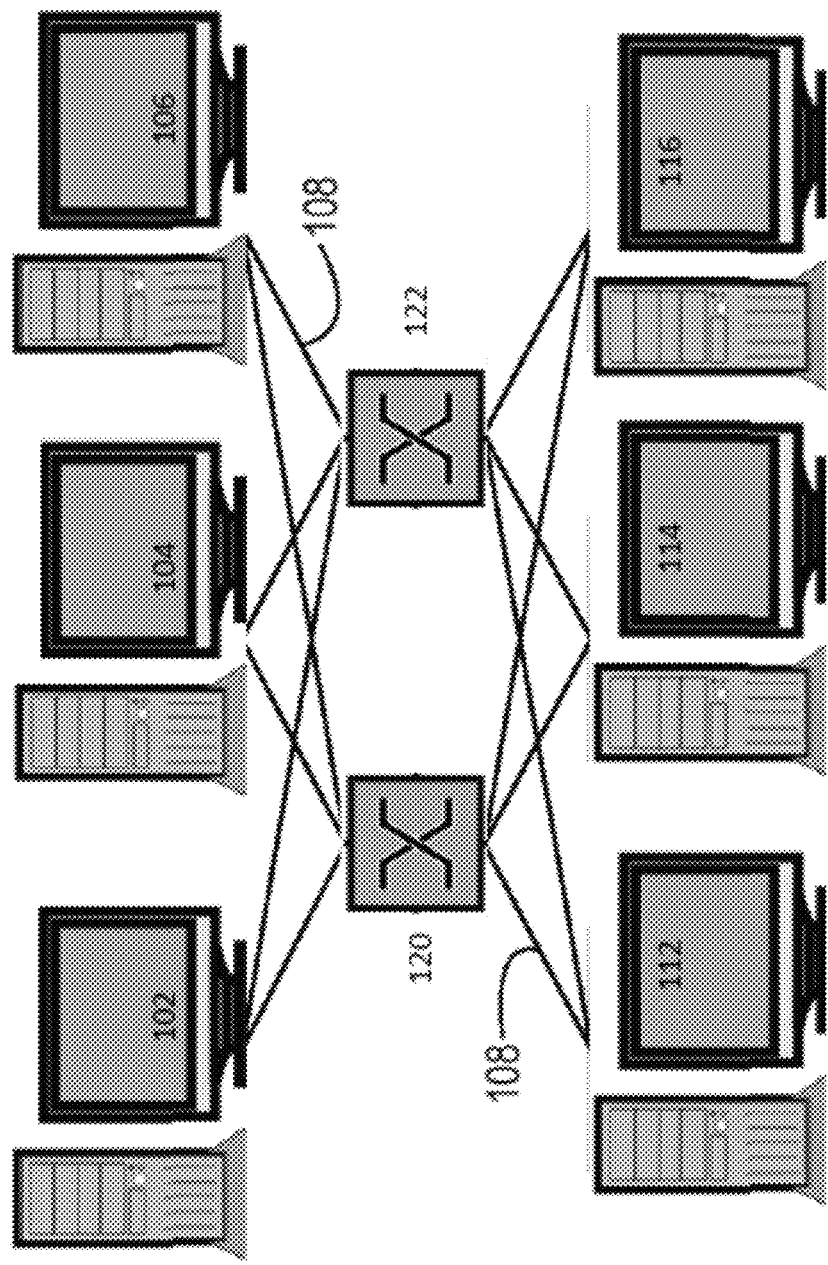
FIG. 1 depicts a block diagram of an example physical topology of a network according to aspects of the disclosure.

Generally disclosed herein are implementations for discrete event network simulation (DENS). FIG. 1 depicts a block diagram of an example physical topology of a network 100. The network 100 can facilitate interactions between participant devices. Example networks include the Internet, a local network, a network fabric, or any other local area or wide area network. The network 120 can be composed of multiple connected sub-networks or autonomous networks. The network 100 can be a local-area network (LAN), such as a company intranet, a metropolitan area network (MAN), a wide area network (WAN), an inter-network such as the Internet, or a peer-to-peer network. Any type and/or form of data network and/or communication network can be used for the network 120. The network can be public, private, or a combination of public and private. In general, the network 100 can be used to convey information between computing devices.

Nodes and links are the basic building blocks in computer networking. A network node may be data communication equipment (DCE) such as a modem, hub or switch, or data terminal equipment (DTE) such as two or more computers and printers. A link refers to the transmission media connecting two nodes. Links may be physical, such as cable wires or optical fibers, or free space used by wireless networks. The network 100 includes upper-level nodes 102, 104, and 106 and lower-level nodes 112, 114, and 116. The upper-level nodes 102, 104, and 106 are coupled to the lower-level nodes 112, 114, and 116 through switches 120 and 122. Switches 120 and 122 can connect multiple network nodes and manage data transmission between them. Switches 120 and 122 can receive data and forward them to the destinations. The upper-level nodes 102, 104, and 106 and the lower-level nodes 112, 114, and 116 are coupled to the switches 120 and 122 through physical links 108.

Figure 2:
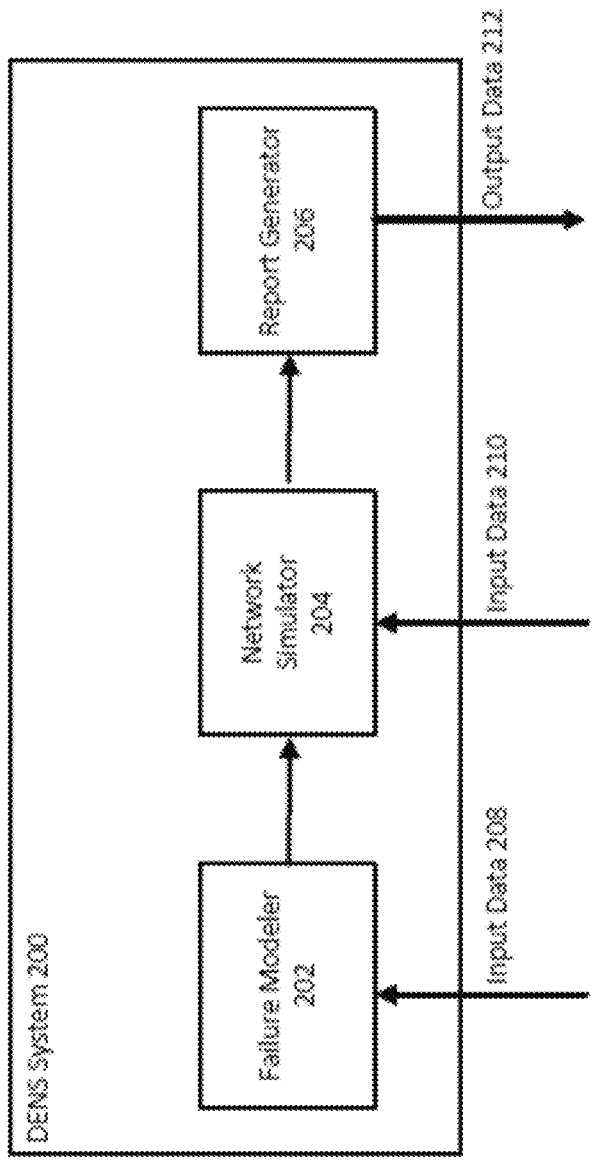
FIG. 2 depicts a block diagram of an example discrete event network simulation (DENS) system according to aspects of the disclosure.

FIG. 2 depicts a block diagram of an example architecture of a discrete event network simulation (DENS) system 200. The DENS system 200 can predict network failures using the network topology 100 shown in FIG. 1. The DENS system can be implemented on one or more computing devices in one or more locations.

The DENS system 200 can include a failure modeler 202, a network simulator 204, and a report generator 206. The failure modeler 202 can be configured to receive input data 208. For example, the failure modeler 202 can receive historical outage data as input data 208, such as outage data obtained from network telemetry archives. The failure modeler 202 can generate expected failures based on the received input data 208, to be reflected in the network simulator 204. The network simulator 204 can also be configured to receive input data 210. For example, the network simulator 204 can receive input data 210 such as network topology, a list of expected traffic flows, and traffic engineering algorithms. The network simulator 204 can also receive failures generated by the failure modeler 202. Using the input data 210 and the generated failures, the network simulator 204 can implement simulation processes and simulate the network with the failures and calculate a flow availability of the network during the simulation. The report generator 206 can be configured to receive various metrics as output data 212 from results of the simulation. The failure modeler 202, network simulator 204, and report generator 206 can be implemented as one or more computer programs, specially configured electronic circuitry, or any combination thereof.

The failure modeler 202 of the DENS system 200 can be configured to conduct failure modeling. To accurately simulate a network, the failure modeler 202 can identify component-level risks that have a likelihood of actually occurring and contributing to overall network risk. For example, components can include network devices such as the upper-level nodes 102, 104, and 106 and the lower-level nodes 112, 114, and 116, terrestrial links 108 as depicted in FIG. 1, control plane functions and exogenous factors. For each component-level risk, stochastic techniques such as K-Means Clustering can be employed to extract a stochastic process model from historical outage data. When a particular network component risk lacks sufficient telemetry history, the history of comparable components data can be applied.

Figure 3:
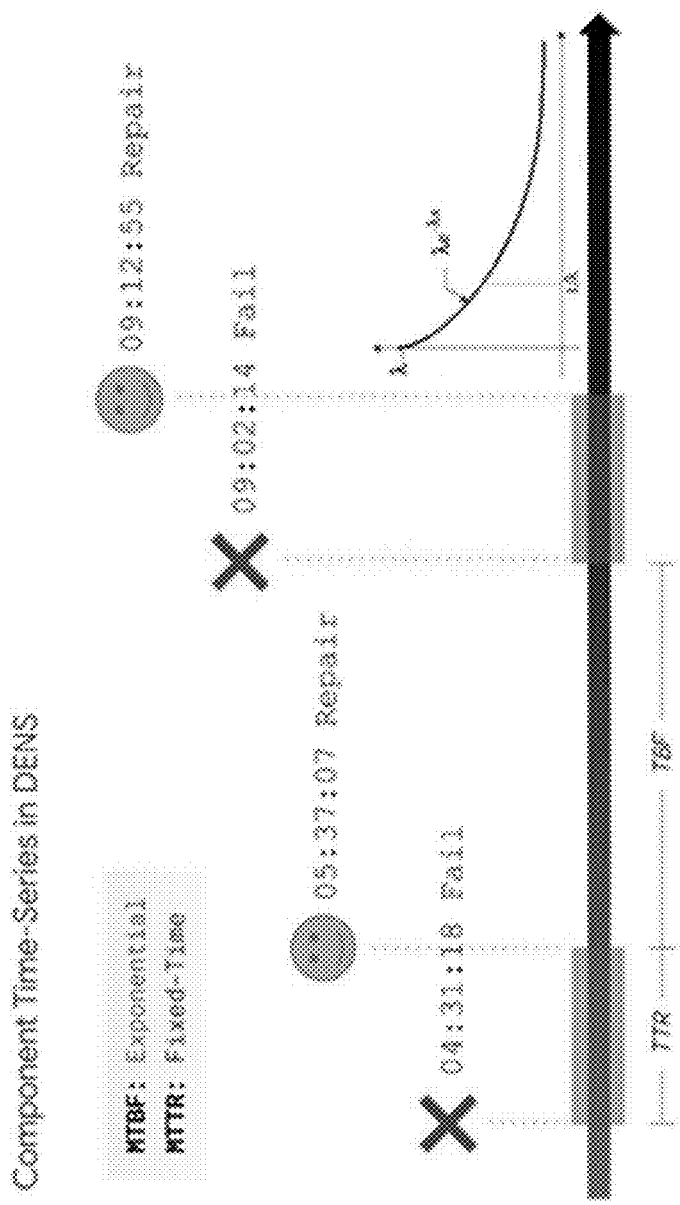
FIG. 3 depicts a block diagram of an example component time-series in a DENS system according to aspects of the disclosure.

Stochastic simulation processes can be implemented through the simulation with modeled mean time between failures (MTBFs) and modeled mean time to recovery (MTTR). For example, MTBFs can be modeled as an exponential distribution with an empirically sourced MTBF. MTTR can be modeled as a fixed repair time equal to an empirically sourced MTTR. FIG. 3 depicts a block diagram of an example component time-series in DENS system 200. The time to recovery 310 and 320 are performed for a fixed time. The time between failures 330 and 340 are distributed along an exponential curve, e.g., the interval between failures follows an exponential distribution, with the probability of failure increasing gradually over time. The component in the network can have multiple failure processes running simultaneously representing different types or root causes of failure.

Figure 4:
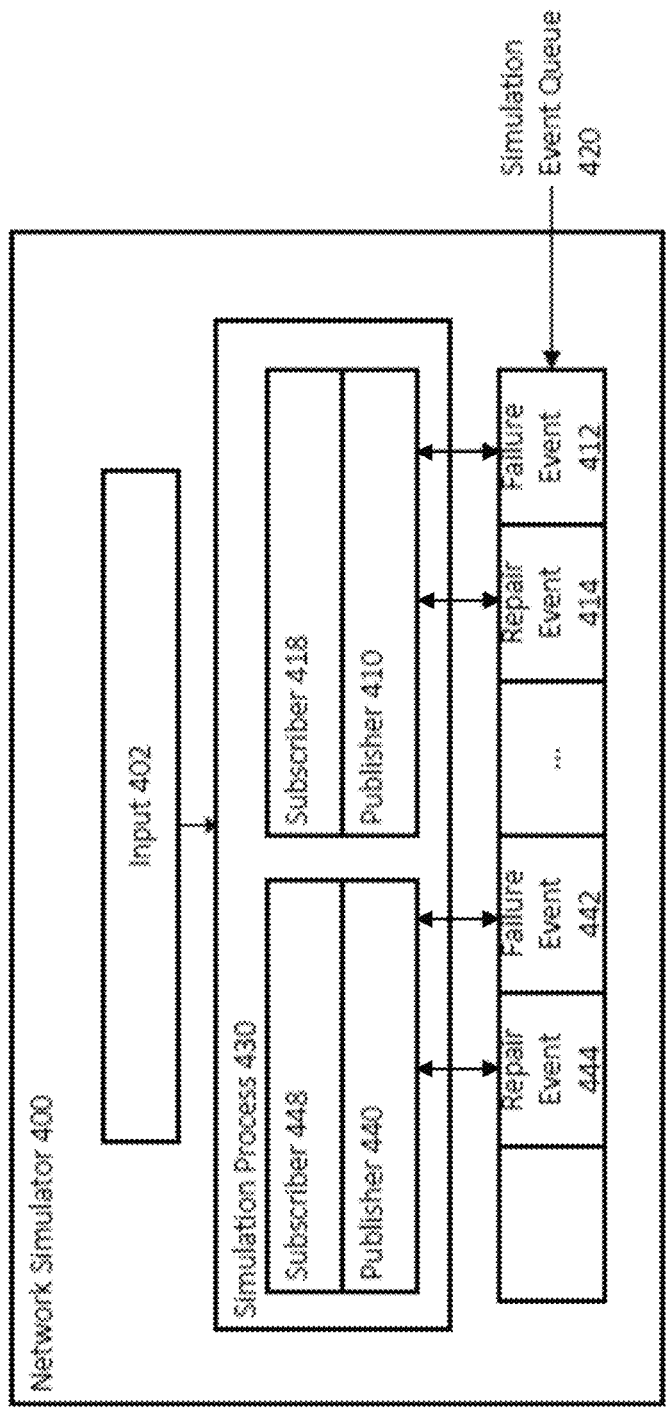
FIG. 4 depicts a block diagram of an example network simulator in a DENS system according to aspects of the disclosure.

FIG. 4 depicts a block diagram of an example network simulator 400 in DENS system such as the network simulator 204 as depicted in FIG. 2. The network simulator 400 can build empirically based stochastic simulation process 430. The network simulator 400 can receive a pseudo-random time-series of MTBF and repair MTTR events as input 402. In order to achieve sufficient accuracy in risk estimation, the network simulator 400 may run simulations corresponding to a significant period of network activity. The network simulator 400 can receive inputs 402 such as network topology, a list of expected traffic flows, and traffic engineering algorithms. These inputs are essential for generating realistic simulations of network behavior and performance.

The network simulator 400 can receive a network topology with a detailed edge-node graph of the network at multiple layers, along with all dependencies between components. For example, the network topology can include considering the effects of any combination of component failures on available pathing and capacity within the network. The list of expected traffic flows may include various elements, such as the source node and destination node of the traffic, which are identifiable within the network topology. It may also include any associated SLOs for the flow, including availability targets, as well as any specific routing requirements to the flow.

The traffic engineering techniques can specify how a network, when faced with a predefined failure scenario, redistributes traffic across its surviving paths and available capacity. For example, if a specific component within the network fails, it will inevitably impact the network's available capacity at that instance. In response, traffic engineering algorithms can define how traffic demand flows within the network. These algorithms can determine which traffic flows remain entirely unaffected, which experience partial disruptions, and which fail completely due to the network's altered conditions.

The simulation process 430 within the network simulator 400 can execute a discrete event simulation. The simulation process 430 can include a plurality of stochastic processes with component failure events, component repair events, and timer events. At the onset, the simulation process 430 initializes with a healthy network and instantiates stochastic process models for each network component. A single network component may have several stochastic process models. Each stochastic process model can randomly sample an MTBF according to its distribution and insert a failure event into the simulation event-queue. For example, the stochastic process 430 can generate a failure event 412 scheduled to be inserted into the simulation event-queue 420 at time 0. Once all stochastic processes have inserted their initial failure event in the simulation event queue, the simulation can start by triggering events in order of their scheduled time.

When a failure event 412 occurs at time T, a repair event 414 scheduled at time T is added to the queue 420. The MTTR can be determined based on the stochastic process which inserted the failure event 412. When a repair event 414 is triggered at time T, the original stochastic process that was responsible for inserting the failure or repair events is then queried for any new events. The stochastic process samples another MTBF value from its input-model and inserts a new failure event 442 in the event queue 420 scheduled at time T. As such, the simulation can continue with each stochastic process inserting events one at a time. This approach effectively prevents the event queue from becoming overwhelmed with an excessive number of events.

Timer events can operate in a similar manner, wherein each timer inserts a single event into the event queue at a predetermined scheduled time. Upon activation of this event, the event queue queries the timer for its subsequent event. This next event is promptly added to the queue at the scheduled time designated by the timer. This cyclical process continues, ensuring that timer events are consistently triggered at their scheduled intervals.

The simulation process 430 can include numerous publishers 410 and 440 and subscribers 418 and 448. The publishers 410 and 440 are event sources responsible for inserting events into the event queue 420. Subscribers 418 and 448 adjacent to publishers 410 and 440 are entities which receive notifications whenever an event occurs. The event subscribers can include network topology, traffic engineering solver, statistical aggregators.

In the event of a failure or repair, network information on available paths and capacity may be updated. Consequently, the traffic solver evaluates potential flow routing changes based on the updated network. For example, if a failure event is triggered and the available capacity of a link drops to zero, flows must find an alternate path from the source to the destination. In this case, the traffic engineering solver must be immediately notified of the event to evaluate and adjust the flow routing accordingly.

When events are triggered and flow routing is recalculated, the network simulator 400 can monitor and record statistics accumulated by the end of the simulation. These statistics can include flow availability, indicating the effectiveness with which demand was able to traverse from its source to destination across different failure scenarios. The statistics aggregator can receive notifications about event occurrence, recognize all changes in network state and the duration between these states, and accurately track and analyze network performance throughout the simulation process.

The simulation output can include various statistical summaries, including the time distribution of partial flow availability over the simulation, the time distribution of flow path diversity over the simulation, and the time to failure by flow. These statistics are presented both on a per-flow basis and for flow aggregations, which can include any combination of geographically based flows you choose.

The report generator 206 in DENS system 200 can be configured to generate metrics output 212 such as SLO index (SLIX) or Time-to-SLIX (TSX) from the simulation output. The metrics describe network performance and risk, and estimate the expected time until a flow outage occurs.

The SLIX metric can be computed for individual flows, such as source, destination, SLO, as well as for arbitrary aggregates of flows. SLIX is a single numerical value that indicates how a flow or flow-aggregate is expected to perform relative to its SLO. A negative SLIX value for a flow or flow-aggregate suggests a risk that the network may struggle to support that flow or aggregate at its SLO. Conversely, a positive SLIX value indicates minimal SLO risk, but it may also imply over-performance and potential network overbuilding.

The report generator 206 can provide an estimate of the expected time until an outage is observed in violation of the SLO through the TSX metric. This is achieved by treating each of the significant of parallel universe computations as a single observation. Predicting these violation events provides insights for network design and management.

Figure 5:
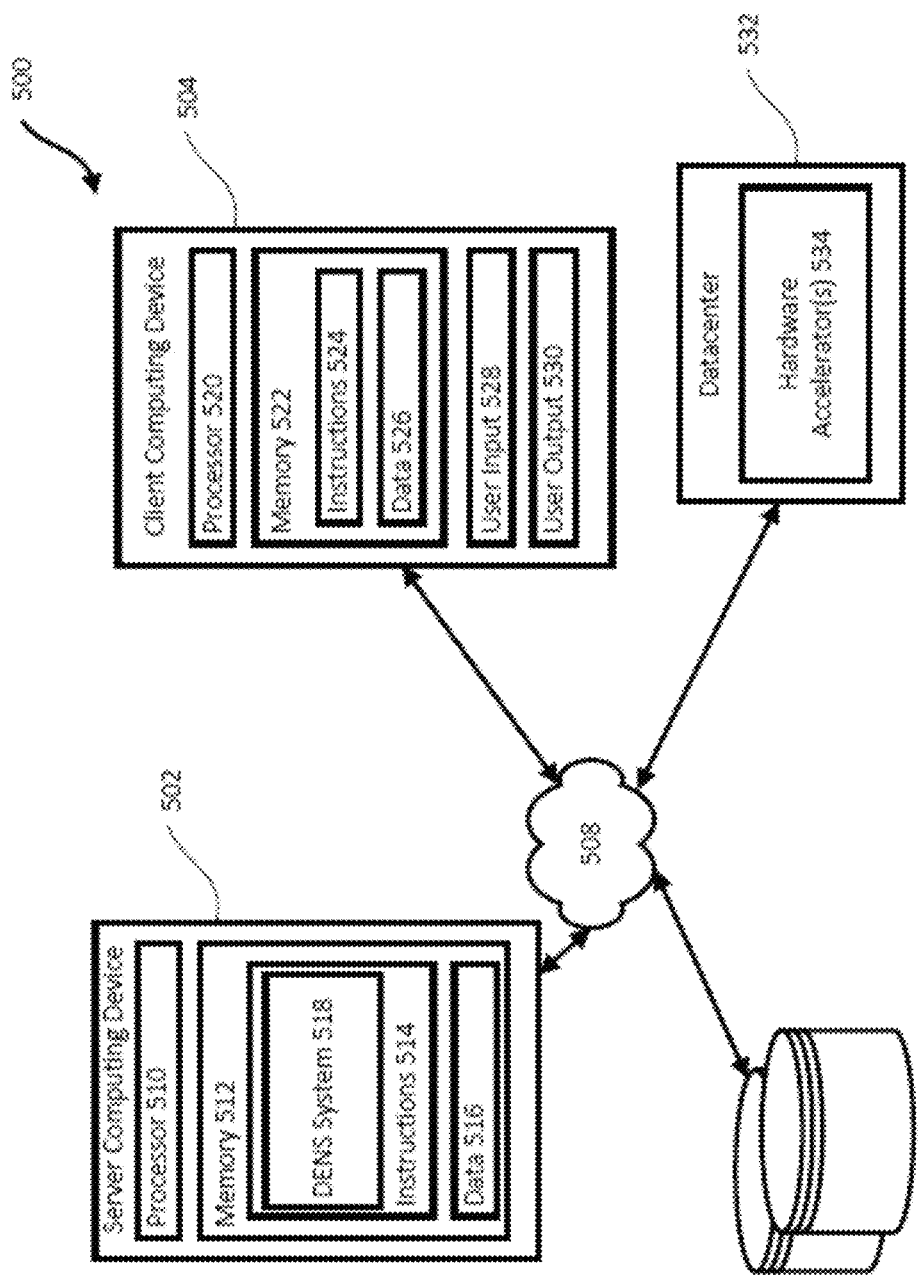
FIG. 5 depicts a block diagram of an example computing environment implementing a DENS system according to aspects of the disclosure.

FIG. 5 depicts a block diagram of an example environment 500 implementing an example DENS system 518. The DENS system 518 can be implemented on one or more devices having one or more processors in one or more locations, such as in server computing device 502. Client computing device 504 and the server computing device 502 can be communicatively coupled to one or more storage devices 506 over a network 508. The storage devices 506 can be a combination of volatile and non-volatile memory and can be at the same or different physical locations than the computing devices 502, 504. For example, the storage devices 506 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 502 can include one or more processors 510 and memory 512. The memory 512 can store information accessible by the processors 510, including instructions 514 that can be executed by the processors 510. The memory 512 can also include data 516 that can be retrieved, manipulated, or stored by the processors 510. The memory 512 can be a type of transitory or non-transitory computer readable medium capable of storing information accessible by the processors 510, such as volatile and non-volatile memory. The processors 510 can include one or more central processing units (CPUs), graphic processing units (GPUs), field-programmable gate arrays (FPGAs), and/or application-specific integrated circuits (ASICs), such as tensor processing units (TPUs).

The instructions 514 can include one or more instructions that, when executed by the processors 510, cause the one or more processors 510 to perform actions defined by the instructions 514. The instructions 514 can be stored in object code format for direct processing by the processors 510, or in other formats including interpretable scripts or collections of independent source code modules that are interpreted on demand or compiled in advance. The instructions 514 can include instructions for implementing a DENS system 518, which can correspond to the DENS system 200 of FIG. 2. The DENS system 518 can be executed using the processors 510, and/or using other processors remotely located from the server computing device 502.

The data 516 can be retrieved, stored, or modified by the processors 510 in accordance with the instructions 514. The data 516 can be stored in computer registers, in a relational or non-relational database as a table having a plurality of different fields and records, or as JSON, YAML, proto, or XML documents. The data 516 can also be formatted in a computer-readable format such as, but not limited to, binary values, ASCII, or Unicode. Moreover, the data 516 can include information sufficient to identify relevant information, such as numbers, descriptive text, proprietary codes, pointers, references to data stored in other memories, including other network locations, or information that is used by a function to calculate relevant data.

The client computing device 504 can also be configured similarly to the server computing device 502, with one or more processors 520, memory 522, instructions 524, and data 526. The client computing device 504 can also include a user input 528 and a user output 530. The user input 528 can include any appropriate mechanism or technique for receiving input from a user, such as keyboard, mouse, mechanical actuators, soft actuators, touchscreens, microphones, and sensors.

The server computing device 502 can be configured to transmit data to the client computing device 504, and the client computing device 504 can be configured to display at least a portion of the received data on a display implemented as part of the user output 530. The user output 530 can also be used for displaying an interface between the client computing device 504 and the server computing device 502. The user output 530 can alternatively or additionally include one or more speakers, transducers or other audio outputs, a haptic interface or other tactile feedback that provides non-visual and non-audible information to the platform user of the client computing device 504.

Although FIG. 5 illustrates the processors 510, 520 and the memories 512, 522 as being within the respective computing devices 502, 504, components described herein can include multiple processors and memories that can operate in different physical locations and not within the same computing device. For example, some of the instructions 514, 524 and the data 516, 526 can be stored on a removable SD card and others within a read-only computer chip. Some or all of the instructions 514, 524 and data 516, 526 can be stored in a location physically remote from, yet still accessible by, the processors 510, 520. Similarly, the processors 510, 520 can include a collection of processors that can perform concurrent and/or sequential operation. The computing devices 502, 504 can each include one or more internal clocks providing timing information, which can be used for time measurement for operations and programs run by the computing devices 502, 504.

The server computing device 502 can be connected over the network 508 to a data center 532 housing any number of hardware accelerators 534. The data center 532 can be one of multiple data centers or other facilities in which various types of computing devices, such as hardware accelerators, are located. Computing resources housed in the data center 532 can be specified for deploying DENS as described herein.

The server computing device 502 can be configured to receive requests to process data from the client computing device 504 on computing resources in the data center 532. For example, the environment 500 can be part of a computing platform configured to provide a variety of services to users, through various user interfaces and/or application programming interfaces (APIs) exposing the platform services. As an example, the variety of services can include natural language processing, anomaly detection, and/or audio, video, and/or image processing. The client computing device 504 can transmit input data as part of a query for a particular task. The DENS system 518 can receive the input data, and in response, generate output data including a response to the query for the particular task.

The server computing device 502 can maintain a variety of DENS in accordance with different constraints available at the data center 532. For example, the server computing device 502 can maintain different families for deploying DENS on various types of TPUs and/or GPUs housed in the data center 532 or otherwise available for processing.

The devices 502, 504 and the data center 532 can be capable of direct and indirect communication over the network 508. For example, using a network socket, the client computing device 504 can connect to a service operating in the data center 532 through an Internet protocol. The devices 502, 504 can set up listening sockets that may accept an initiating connection for sending and receiving information. The network 508 can include various configurations and protocols including the Internet, World Wide Web, intranets, virtual private networks, wide area networks, local networks, and private networks using communication protocols proprietary to one or more companies. The network 508 can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTER standard for wireless broadband communication. The network 508, in addition or alternatively, can also support wired connections between the devices 502, 504 and the data center 532, including over various types of Ethernet connection.

Although a single server computing device 502, client computing device 504, and data center 532 are shown in FIG. 3, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing machine learning models, or any combination thereof.

In addition to the systems described above, various methods which may be executed using the above systems are now described. While the operations of such methods are described in a particular order, it should be understood that the order may be modified and that some operations may be executed partly or wholly in parallel with other operations. Moreover, operations may be added or omitted.

Figure 6:
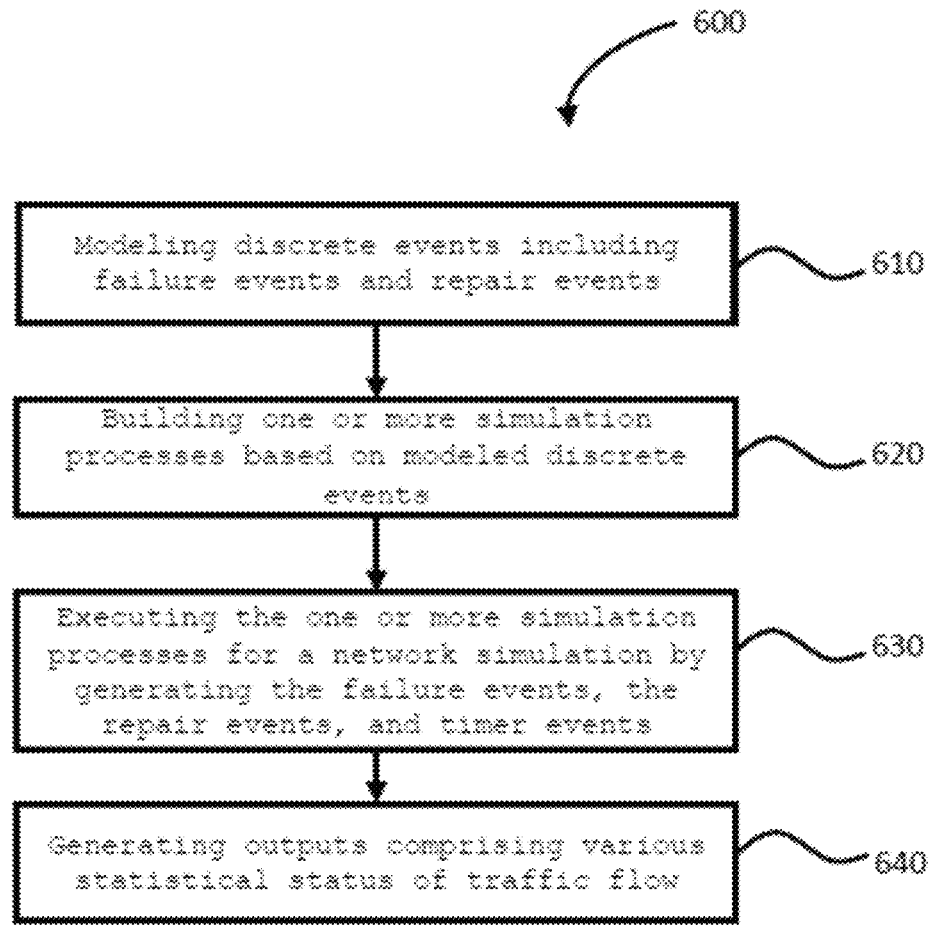
FIG. 6 depicts a flow diagram of an example process for a DENS system according to aspects of the disclosure.

FIG. 6 is a flow diagram illustrating an example process 600 for a DENS system, such as the DENS system 200 as depicted in FIG. 2. The example process 600 can be performed on one or more processors in one or more locations, such as on a server computing device 500 as depicted in FIG. 5.

As shown in block 610, the failure modeler 202 in the DENS system 200 can model discrete events for the network simulation. The discrete events can include failure events and repair events. The failure events can be modeled as an exponential distribution with an empirically sourced MTBFs and the repair events can be modeled as a fixed repair time equal to an empirically sourced MTTRs.

As shown in block 620, the network simulator 204 can build one or more simulation processes, such as stochastic process models, based on the modeled discrete events. The simulation processes can be designed to reflect component-level risk. To build the simulation process, the network simulator 204 can use network telemetry archives and stochastic techniques such as K-means clustering.

As shown in block 630, the network simulator 204 in the DENS system 200 can execute the one or more simulation processes for a network simulation. The network simulator 204 can receive inputs such as network topology, traffic flow data, and traffic engineering techniques for the simulation and generate discrete events including the failure events, repair events, and timer events. These events may be triggered simultaneously by multiple stochastic processes, and a single component may handle multiple events.

The simulation process of the network simulator 204 can include a multitude of publishers and subscribers. The publishers can generate the discrete events and store these events into the event queue. When a publisher generates an event and the event occurs, the network topology, which is one of the subscribers, can update its network information, prompting updates to available paths and capacities. Based on the updated network information, the traffic engineering solver, which is one of the subscribers, can reassess changes to traffic flow routing, thereby finding new paths for data transmission from source to destination. During the iterative process with each occurrence of events and recalculation of flow routing, the statistical aggregator, which is also one of the subscribers, can obtain statistics until the simulation concludes.

As shown in block 640, the statistical aggregator can generate outputs comprising various statistical status of traffic flow. Based on the outputs, the report generator 206 can provide diverse metrics, enabling an evaluation of network performance and risk.

In this specification, the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the

The invention claimed is:

1. A method for discrete event network simulation, the method comprising:
modeling, by one or more processors, a plurality of discrete events comprising failure events and repair events, wherein the failure events are modeled as an exponential distribution with an empirically sourced mean time between failures (MTBFs) and the repair events are modeled as a fixed repair time equal to an empirically sourced mean time between failures (MTTRs);
building, by the one or more processors, one or more simulation processes based on the modeled discrete events;
executing, by the one or more processors, the one or more simulation processes for a network simulation by generating the failure events and the repair events; and
generating, by the one or more processors, metrics for traffic flow of the network simulation based on the executed simulation processes.

2. The method of claim 1, wherein the one or more simulation processes are built based on component-level risks.

3. The method of claim 1, wherein the one or more simulation processes are built using a K-means clustering technique.

4. The method of claim 1, wherein the executing the one or more simulation processes comprises receiving, by the one or more processors, network topology data, traffic flow data, and traffic engineering techniques.

5. The method of claim 1, the method further comprising generating, by the one or more processors, the plurality of discrete events for the network simulation.

6. The method of claim 5, the method further comprising enqueueing, by the one or more processors, the generated plurality of discrete events into event queues.

7. The method of claim 1, wherein the network topology data is updated when the one or more simulation processes are executed using the plurality of discrete events.

8. A system comprising:
one or more processors; and
one or more storage devices coupled to the one or more processors and storing instructions that, when executed by the one or more processors, cause the one or more processors to perform operations for discrete event network simulation (DENS), the operations comprising:
modeling a plurality of discrete events comprising failure events and repair events, wherein the failure events are modeled as an exponential distribution with an empirically sourced mean time between failures (MTBFs) and the repair events are modeled as a fixed repair time equal to an empirically sourced mean time between failures (MTTRs);
building one or more simulation processes based on the modeled discrete events;
executing the one or more simulation processes for a network simulation by generating the failure events and the repair events; and
generating metrics for traffic flow of the network simulation based on the executed simulation processes.

9. The system of claim 8, wherein the one or more simulation processes are built based on component-level risks.

10. The system of claim 8, wherein the one or more simulation processes are built using a K-means clustering technique.

11. The system of claim 8, wherein the executing the one or more simulation processes comprises receiving network topology data, traffic flow data, and traffic engineering techniques.

12. The system of claim 8, the operations further comprising generating the plurality of discrete events for the network simulation.

13. The system of claim 12, the operations further comprising enqueueing the generated plurality of discrete events into event queues.

14. The system of claim 8, wherein the network topology data is updated when the one or more simulation processes are executed using the plurality of discrete events.

15. A non-transitory computer readable medium for storing instructions that, when executed by one or more processors, cause the one or more processors to perform operations for discrete event network simulation (DENS), the operations comprising:
modeling a plurality of discrete events comprising failure events and repair events, wherein the failure events are modeled as an exponential distribution with an empirically sourced mean time between failures (MTBFs) and the repair events are modeled as a fixed repair time equal to an empirically sourced mean time between failures (MTTRs);
building one or more simulation processes based on the modeled discrete events;
executing the one or more simulation processes for a network simulation by generating the failure events and the repair events; and
generating metrics for traffic flow of the network simulation based on the executed simulation processes.

16. The non-transitory computer readable medium of claim 15, the operations further comprising generating the plurality of discrete events for the network simulation.

17. The non-transitory computer readable medium of claim 15, wherein the executing the one or more simulation processes comprises receiving network topology data, traffic flow data, and traffic engineering techniques.

18. The non-transitory computer readable medium of claim 15, wherein the network topology data is updated when the one or more simulation processes are executed using the plurality of discrete events.

* * * * *